United States Patent [19]

Ono et al.

[11] Patent Number: 5,363,105
[45] Date of Patent: Nov. 8, 1994

[54] STRUCTURE OF MULTI-BAND MICROWAVE DETECTOR

[75] Inventors: Hisao Ono, Okazaki; Takeshi Hatasa, Toyota, both of Japan

[73] Assignee: Yupiteru Industries Co., Ltd., Tokyo, Japan

[21] Appl. No.: 51,648

[22] Filed: Apr. 26, 1993

[30] Foreign Application Priority Data

Apr. 28, 1992 [JP] Japan ................. 4-110026

[51] Int. Cl.$^5$ ................................. G01S 7/40
[52] U.S. Cl. ............................ 342/20; 342/175
[58] Field of Search .................... 342/20, 175; 343/700 MS File

[56] References Cited

U.S. PATENT DOCUMENTS

| | | | |
|---|---|---|---|
| 4,571,593 | 2/1986 | Martinson | 342/20 X |
| 4,613,989 | 9/1986 | Fende et al. | 342/20 X |
| 4,939,521 | 7/1990 | Burin | 342/20 |
| 4,961,074 | 10/1990 | Martinson | 342/20 |
| 5,268,689 | 12/1993 | Ono et al. | 342/20 |

Primary Examiner—John B. Sotomayor
Attorney, Agent, or Firm—Wenderoth, Lind & Ponack

[57] ABSTRACT

A microwave detector comprises a one side opened hollow member having a first portion and a second portion, a printed circuit board, on which a metal layer is formed on one side, the metal layer on the printed circuit board cooperating with the hollow member for forming a horn antenna at a position corresponding to the first portion and an oscillation cavity for housing a first local oscillator at a position corresponding to the second portion, the horn antenna including a throat portion communicated with the oscillation cavity, a first mixing circuit disposed in the throat portion, an intermediate frequency processing circuit formed on the other side of the printed circuit board and including a first intermediate frequency filter, a second mixing circuit and a second local oscillator, and means for establishing electrical connection between the first mixing circuit and the intermediate frequency processing circuit across the printed circuit board.

6 Claims, 4 Drawing Sheets

STRUCTURE OF MULTI-BAND MICROWAVE DETECTOR

BACKGROUND OF THE INVENTION

1. Field of the Invention

The present invention relates generally to a microwave detector for detecting a microwave from a specific source, such as a measuring equipment. More specifically, the invention relates to a structure of a reception frequency converting portion for performing frequency mixing of a received wave by a horn antenna and an output of a local oscillator.

2. Description of the Related Art

Multi-band microwave detectors, such as so-called radar detectors which are adapted to detect microwaves transmitted from radar type speed measurement alarm equipment for alarming, have been known in the prior art. For example, U.S. Pat. No. 4,571,593, issued on Feb. 18, 1976 to Martinson, U.S. Pat. No. 4,939,521, issued on Jul. 3, 1990 to Burin, and U.S. Pat. No. 4,961,074, issued on Oct. 2, 1990 to Martinson disclose radar detectors of the type that the present invention is directed. Typical traffic monitoring radar type speed measuring equipment (hereinafter referred to as "radar") employ microwaves from among a plurality of frequency bands, i.e., 10 GHz band (X band), 24 GHz band (K band) and 35 GHz band (Ka band). The known radar detectors receive the microwave transmitted from the radar through a heterodyne type receiver circuit, such as a super-heterodyne receiver circuit.

In such a microwave detector, a horn antenna is generally employed as a reception antenna. At a feeding point in a throat portion of the horn antenna, a mixing diode is provided. A microwave circuit comprising a local oscillator is provided inside the throat portion of the horn antenna. The mixing diode performs frequency mixing of the reception signal received by the horn antenna and the output of the local oscillator. Also, in order to avoid affects of the reception input through the horn antenna for operation of the local oscillator, an appropriate filter is provided between the mixing stage and the local oscillator. In the known art, there is a type of construction wherein the mixer and the local oscillator are formed by a microwave circuit employing a wave guide. Also, it is known to form the mixer and the local oscillator with a microwave IC employing a micro-strip line.

Japanese Unexamined Patent Publication No. 61-500944 which corresponds to U.S. Pat. No. 4,571,593 discloses one of typical constructions of such a multi-band microwave detector. The structure disclosed in the above-identified publications will be briefly discussed herebelow with reference to FIG. 1.

In FIG. 1, a lower end opened aluminum die-casted antenna part 2 is fixedly secured on the upper surface of a printed circuit board 1 by screws. A metal layer (copper foil) 3 is formed on the upper surface of the printed circuit board 1 in a desired pattern. The antenna part 2 is mounted to cover the metal layer 3 in such a manner that the opened lower end of the antenna part 2 is press-fitted by the metal layer 3. The antenna part 2 is formed integrally with a horn antenna portion 2a and two shield casing portions 2b and 2c. The shield casing portion 2b is communicated with a throat portion of the horn antenna portion 2a.

The lower end opened horn antenna portion 2a cannot solely perform the function as the horn antenna but has to be cooperated with the metal layer 3 press-fitting the opened lower end for performing the desired horn antenna function.

A microwave IC circuit 4 is disposed in a space defined by the printed circuit board 1 and the shield casing portion 2b. The microwave IC circuit 4 includes a first local oscillator (not shown), a micro-strip line for guiding the output of the first local oscillator to a mixing diode 4b, a feed strip 4a kept in contact with a ridge 2d integrally formed at the center of the horn antenna portion 2a for receiving an antenna input, and a first intermediate frequency filter 4c for receiving a frequency mixing output obtained by mixing the antenna input with the output of the first local oscillator. These components of the microwave IC circuit are installed on a dielectric substrate.

At a portion of the printed circuit board 1 covered by the shield casing portion 2c, a second local oscillator, a second frequency mixing circuit for performing a frequency mixing of the output of the second local oscillator and the output of the microwave IC circuit 4, and a filter receiving the output of the second frequency mixing circuit are installed, although these components are omitted from illustration. A circuit composed of these elements will be hereafter referred to as "intermediate frequency processing circuit portion 5". A detector circuit for detecting the output of the intermediate frequency processing circuit, a discrimination circuit for discriminating a specific reception signal from the detection output, an alarm circuit for generating an alarm in response to the discrimination output and so forth are installed on the lower side surface of the printed circuit board 1.

As shown in FIG. 1, a construction employing the metal layer 3 formed on the printed circuit board 1 as a part of the constructional element of the horn antenna is advantageous from viewpoint of cost and from the viewpoint of down-sizing of the device in comparison with the construction employing the antenna part solely operable as the horn antenna. On the other hand, in the above-mentioned prior art, the first local oscillator, the first frequency mixing circuit, and the intermediate frequency filter are formed in the microwave IC circuit 4 to incorporate the input of the horn antenna as the microwave circuit with a wave guide in the feed strip 4a of the microwave IC circuit 4 as a microwave plane circuit. The microwave IC employing the micro-strip line is certainly beneficial from the viewpoints of down-sizing and making the circuit free from adjusting to gain required characteristics. However, it requires high precision in patterning of the strip conductor on a dielectric substrate and thus requires high designing skill. This results in disadvantages from the viewpoint of machining precision requirement and yield in production of the parts. In particular, for establishing desired relationship between the ridge 2d and the feed strip 4a for effectively feeding the antenna input, substantially high skill is required. To this respect, the microwave circuit employing the wave guide permits easy adjustment of the characteristics by aligning means, such as an iris, a pin or so forth, even after assembling the main body of the microwave circuit. Furthermore, know-how in the adjustment technology have been accumulated for many years. Accordingly, from the view of ease of adjustment, the microwave circuit with a wave guide is superior over the microwave plane circuit.

On the other hand, in the conventional construction of FIG. 1, since the intermediate frequency filter 4c is exposed to the antenna input and the first local oscillator output, the intermediate frequency filter may be affected for generation of the noise or so forth. Furthermore, similarly to the upper surface side of the intermediate frequency processing circuit portion 5 covered by the shield casing portion 2c, the lower surface side has to be shielded by a shielding metal layer or so forth. When the shielding metal layer is formed on the lower surface side of the intermediate frequency processing circuit portion 5, the lower surface side cannot be used for installation of other circuits. Accordingly, wider substrate area becomes necessary to increase the size of the substrate. Furthermore, it is cumbersome to provide a connecting means for transferring the output of the microwave IC circuit 4 to the intermediate frequency processing circuit portion 5 in the shield casing portion 2c. For instance, when a wiring pattern extending from the microwave IC circuit 4 to the intermediate frequency processing circuit portion 5 is formed on the printed circuit board 1, the wiring pattern and the antenna part 2 have to be insulated from each other. Also, for instance for establishing connection between the microwave IC circuit 4 and the intermediate frequency processing circuit portion 5, the surface side of the microwave IC circuit 4 is connected to the back side through the substrate by means of a pin, an eyelet and so forth, connected to the portion beneath the intermediate frequency processing circuit portion 5 by means of the wiring pattern on the back side of the substrate, and then connected to the intermediate frequency processing circuit portion 5 on the surface side of the substrate 1 via a pin, an eyelet, a through hole or so forth. Establishing such a connection is very cumbersome.

SUMMARY OF THE INVENTION

Therefore, it is an object of the present invention to provide a multi-band microwave detector employing a metal layer formed on a printed circuit board as a part of constructional elements of a horn antenna and a microwave circuit, which permits installation of a first frequency mixing portion and peripheral circuits thereof and a second frequency mixing portion and peripheral circuits thereof with simple and compact construction.

In order to accomplish the above-mentioned and other objects, a microwave detector, according to one aspect of the invention, comprises:

a printed circuit board having a metal layer formed on an upper side thereof;

a metallic microwave circuit part having an opened lower end which is closed by the metal layer on the printed circuit board, the microwave circuit part cooperating with the metal layer for defining a horn antenna and a cavity communicating with the inner end of a throat portion of the horn antenna;

a mixing diode positioned at a feeding point in the throat portion of the horn antenna and interposed between the microwave circuit part and the printed circuit board, the mixing diode having an output terminal extending through the printed circuit board and exposed on the lower side of the printed circuit board;

a first local oscillator installed on a microwave circuit board disposed in the cavity;

an intermediate frequency processing circuit portion positioned on the lower side of the printed circuit board around the portion where the output terminal of the mixing diode is exposed, the intermediate frequency processing circuit including a first intermediate frequency filter, a second mixing circuit and a second local oscillator; and a shield casing mounted on the lower side of the printed circuit board with covering the intermediate frequency processing circuit portion.

According to another aspect of the invention, a microwave detector comprises:

a one side opened hollow member having a first portion and a second portion;

a printed circuit board, on which a metal layer is formed on one side, the metal layer on the printed circuit board cooperating with the hollow member for forming a horn antenna at a position corresponding to the first portion and an oscillation cavity for housing a first local oscillator at a position corresponding to the second portion, the horn antenna including a throat portion communicated with the oscillation cavity;

a first mixing circuit disposed in the throat portion;

an intermediate frequency processing circuit formed on the other side of the printed circuit board and including a first intermediate frequency filter, a second mixing circuit and a second local oscillator; and means for establishing electrical connection between the first mixing circuit and the intermediate frequency processing circuit across the printed circuit board.

In this case, the means for establishing electrical connection may comprise a terminal of the first mixing circuit extending through the printed circuit board to be exposed to the other side thereof. Preferably, the first mixing circuit comprises a mixing diode assembly including a rigid leg serving as the terminal and extending through the printed circuit board from the one side to the other side. The mixing diode assembly may comprise a mixing diode and a conductive base for mounting the mixing diode in the throat portion, and the conductive base is formed with the rigid leg.

In the preferred construction, the microwave detector may further comprise a shield casing mounted on the other side of the printed circuit board for shielding the intermediate frequency processing circuit.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

Figure 1:
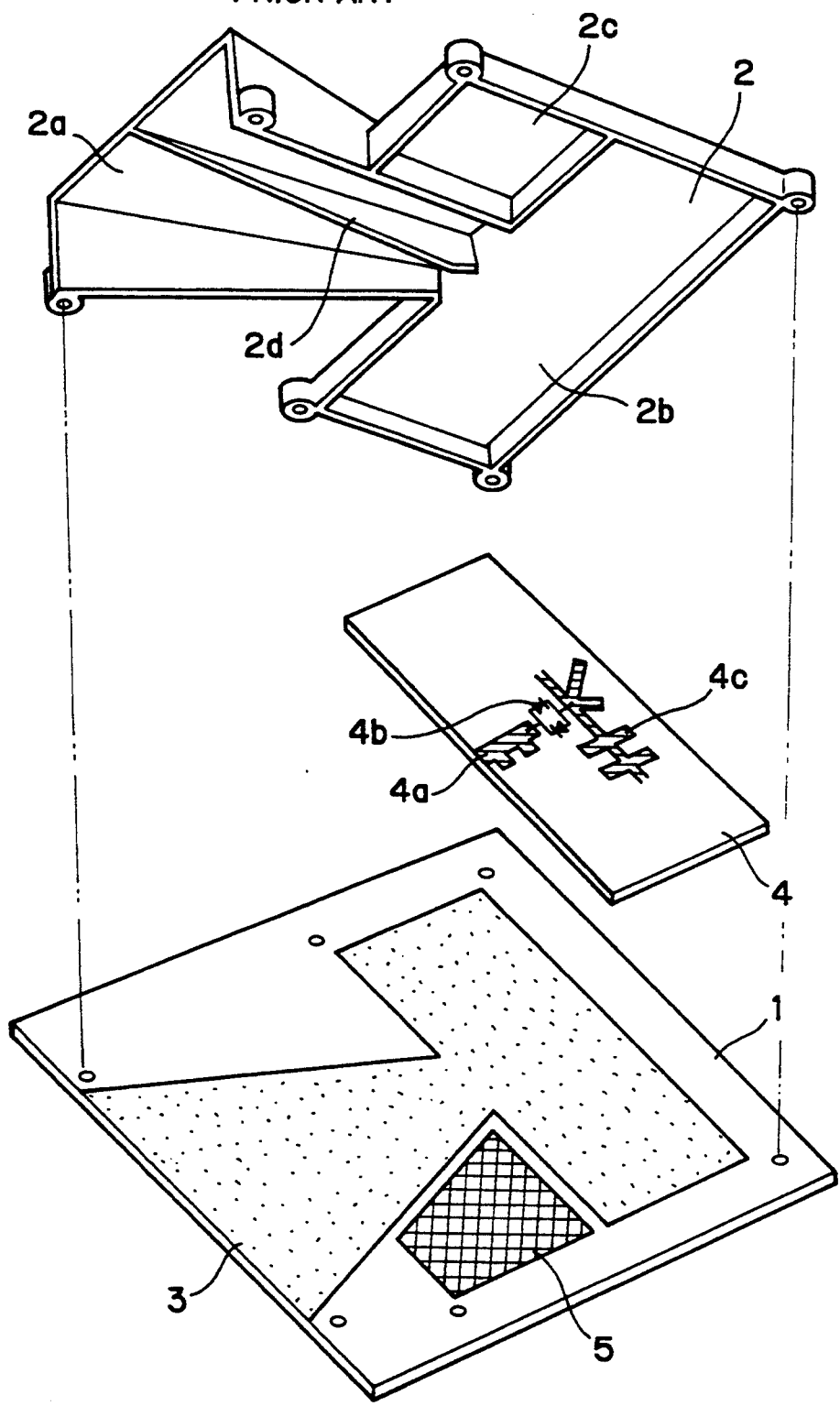
FIG. 1 is an exploded perspective view showing a construction of the conventional microwave detector.
Figure 2:
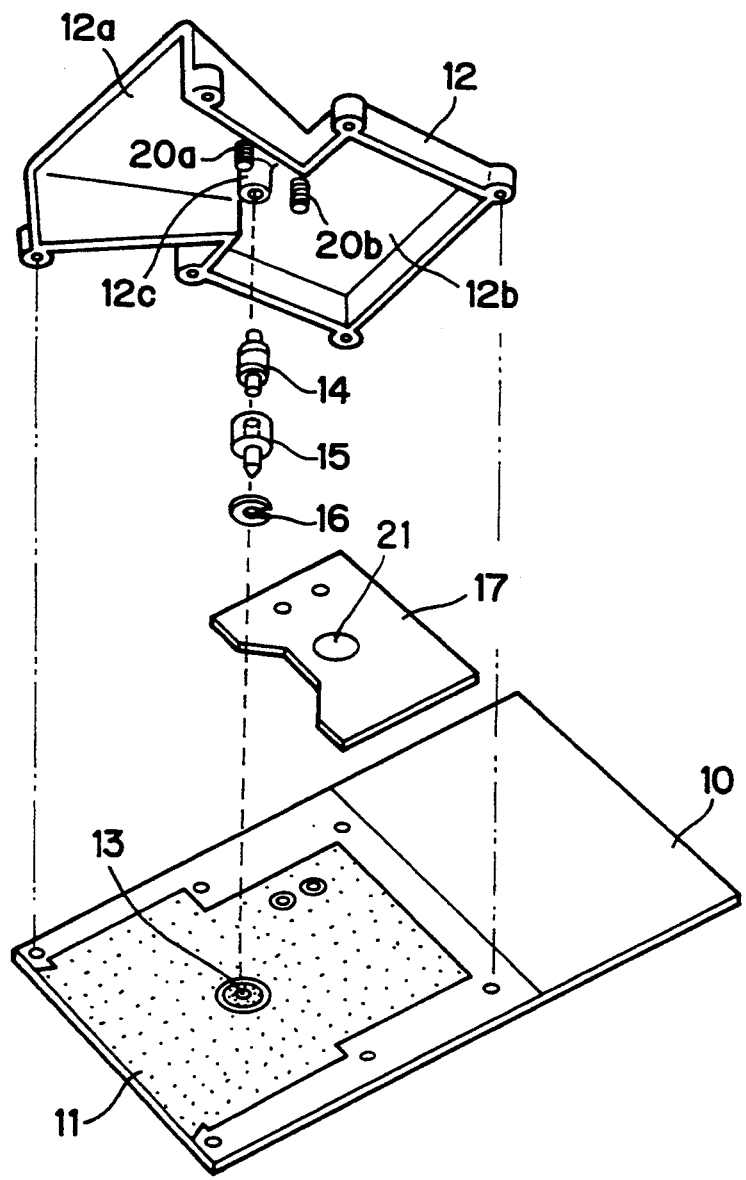
FIG. 2 is an exploded perspective view showing a construction of the preferred embodiment of a multi-band microwave detector according to the present invention.
Figure 3:
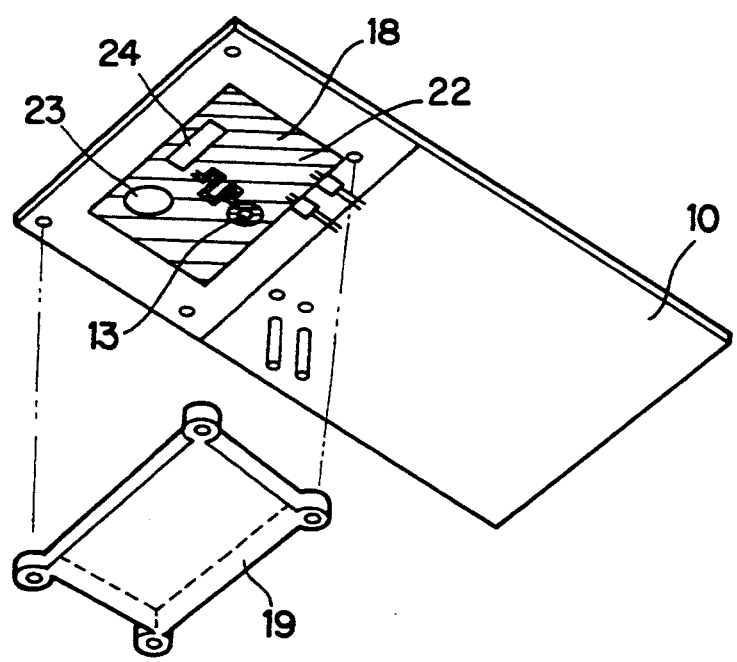
FIG. 3 is an exploded perspective view showing a construction of the lower surface side of a printed circuit board employed in the preferred embodiment of the multi-band microwave detector according to the invention.

The preferred embodiments of a multi-band microwave detector according to the present invention will be discussed with reference to FIGS. 2 to 5. FIGS. 2 and 3 show one embodiment of the microwave detector of the invention. On the upper surface of a rectangular printed circuit board 10, a wide area metal layer (copper foil) 11 is formed in a predetermined desired pattern. An aluminum die-casted microwave circuit part 12 is mounted on the printed circuit board 10 in the manner covering the metal layer 11 and fixed thereto by fastening screws. The microwave circuit part 12 includes a horn antenna portion 12a and a cavity portion 12b. The microwave circuit part 12 has an opened lower surface which is closed by the metal layer 11 when the microwave circuit part 12 is mounted on the printed circuit board 10. Therefore, by mounting the microwave circuit part 12 onto the printed circuit board 10, a horn antenna and a cavity communicated with the horn antenna through a throat portion are defined. In addition, thread type pin matching members 20a and 20b are provided in the microwave circuit part 12 in the vicinity of the throat portion of the horn antenna.

The throat portion of the horn antenna portion 12a of the microwave circuit part 12 is formed with a boss portion 12c. A through hole 13 is formed through the printed circuit board 10 so that the through hole 13 may be placed in alignment with the boss portion 12c when the microwave circuit part 12 is mounted on the printed circuit board. A pin type leg of a metal base 15 is pressed into the through hole 13 via a spring washer 16. The metal base 15 has a recess or a hole on the upper surface, which recess or hole is positioned in alignment with the hole of the boss portion 12c as assembled. Pins extending from both axial ends of a pill type mixing diode 14 are engaged to the aligned recess or holes of the metal base 15 and the boss portion 12c. By the shown construction, the mixing diode 14 can be arranged at a feeding point at the throat portion of the horn antenna in the condition sandwiched by the printed circuit board 10 and the microwave circuit part 12.

A microwave board 17 is disposed in the cavity defined by the metal layer 11 of the printed circuit board 10 and the cavity portion 12b of the microwave circuit part 12. On the microwave board 17, the first local oscillator is installed. The oscillation output of the first local oscillator 21 is emitted into the space in the cavity and reaches the throat portion of the horn antenna. The mixing diode 14 is disposed in the throat portion for frequency mixing of the antenna input and the first local oscillation output.

The metal base 15 for mounting the mixing diode 14 also serves as a terminal of the mixing diode 14. Namely, the output of the mixing diode 14 is led to the lower surface side of the printed circuit board 10 through the metal base 15 which is inserted into the through hole 13.

An intermediate frequency processing circuit portion 18 is installed by planar installation on the lower surface of the printed circuit board 10 around the through hole 13. The intermediate frequency processing circuit portion 18 includes a first intermediate frequency filter 22 receiving the output of the mixing diode 14, a second local oscillator 23, a second mixing circuit 24 for frequency mixing of the output of the second local oscillator 23 and the output of the first intermediate frequency filter 22. A shield casing 19 is mounted on the lower surface side of the printed circuit board 10 in such a manner that it may cover the intermediate frequency processing circuit portion 18.

It should be noted that the pattern of the metal layer 11 on the upper surface side of the printed circuit board 10 is designed not only for closing the opened lower end of the microwave circuit part 12 but also for shielding the intermediate frequency processing circuit portion 18. On the other hand, as shown, the shield casing 19 on the lower surface side of the printed circuit board 10 by common screws. Also, it is neglected from illustration, low frequency circuits, such as a detecting circuit, a reception signal discrimination circuit, an alarm circuit and so forth, are mounted on other area of the printed circuit board 10.

Figure 4:
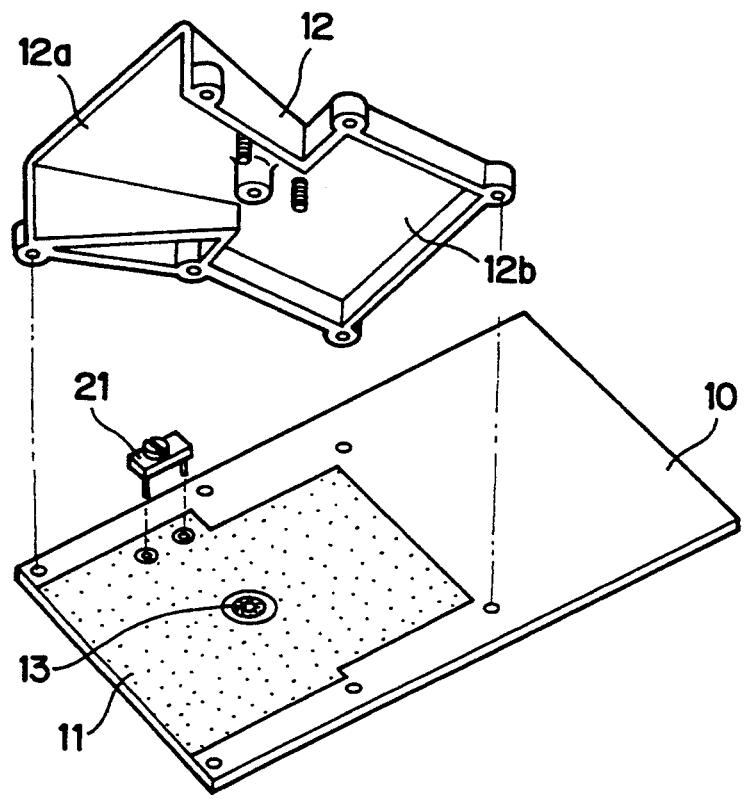
FIG. 4 is an exploded perspective view illustrating a construction of another embodiment of a multi-band microwave detector according to the invention.

FIG. 4 shows a modification of the embodiment of FIGS. 2 and 3. In the shown modification, a trimmer resistor 21 for adjustment of sweeping of the second local oscillator which is included in the intermediate frequency processing circuit portion 18 on the lower surface side of the printed circuit board 10, is mounted on the upper surface side of the printed circuit board 10 with connection to the intermediate frequency processing circuit portion via the through hole.

Figure 5:
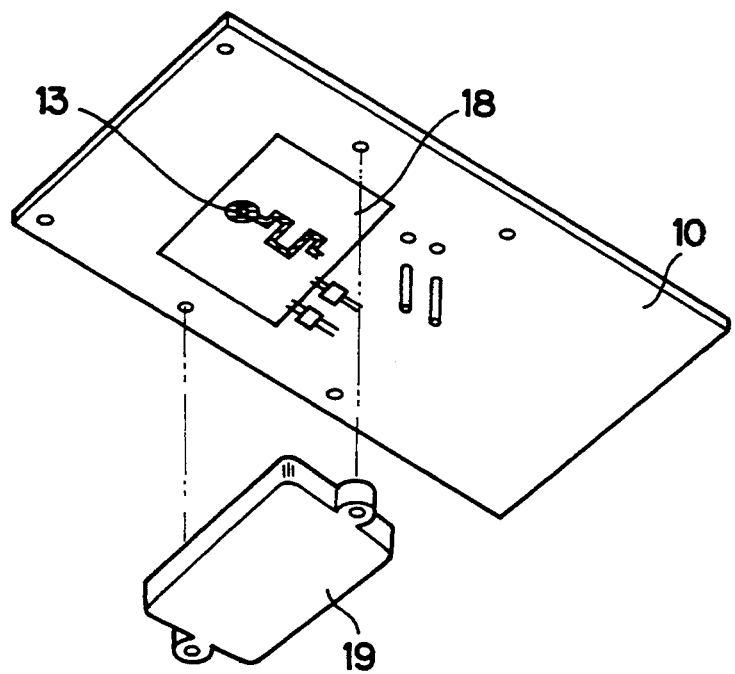
FIG. 5 is an exploded perspective view showing a construction of the lower surface side of a printed circuit board in another embodiment of the multi-band microwave detector of FIG. 4.

FIG. 5 shows another modification of the embodiment of FIGS. 2 and 3, in which the position of the intermediate frequency processing circuit portion 18 on the lower surface side of the printed circuit board 10 is slightly differentiated from those in the former embodiments. As can be appreciated herefrom, the intermediate frequency processing circuit portion 18 can be arranged at any appropriate position around the through hole 13, in which the mixing diode 14 is arranged.

As set forth above, according to the present invention, the microwave detector is constructed utilizing the metal layer formed on the upper surface side of the printed circuit board as a part of the constructional element of the horn antenna and also as a part of the constructional element of the cavity communicated with the inner side of the throat portion of the horn antenna so that the frequency mixing of the antenna input and the output of the first local oscillator is performed in a three dimension circuit structure. Accordingly, different from the prior art technology, in which the microwave IC circuit active in the plane circuit mode is employed, the operation characteristics of the frequency mixing portion can be easily optimized by means of pin matching members provided at necessary points in the microwave circuit. Therefore, it becomes possible to make designing, production and adjustment easier for contributing lowering of the cost.

Also, the terminal of the mixing diode, which is mounted in the throat portion of the horn antenna extends to the lower surface side of the printed circuit board, the intermediate frequency processing circuit portion is installed around the extended portion of the terminal, and the intermediate frequency processing circuit portion is covered by the shield casing. Accordingly, connection between the mixing diode and the intermediate frequency processing circuit portion can be easily done with minimum length path. Furthermore, the first intermediate frequency filter will never be exposed to the antenna input and/or the output of the first local oscillator to realize excellent operation characteristics with avoiding generation of the noise.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

For instance, the present invention is applicable for the microwave detectors disclosed in the commonly owned co-pending U.S. patent applications, Ser. No. 08/045,103, filed Apr. 12, 1993 and entitled "Power Saving Type Multi-Band Microwave Detector", Ser. No. 08/032,261, filed Mar. 17, 1993 entitled "Structure of Reception Frequency Converting Portion in Multi-Band Microwave Detector" and Ser. No. 08/025,632, filed Mar. 1, 1993 and entitled "Multi-Band Microwave Detector". Disclosures of the above-identified co-pending U.S. Patent Applications are herein incorporated by reference.

What is claimed is:

1. A microwave detector comprising:
   a printed circuit board having a metal layer formed on an upper side thereof;
   a metallic microwave circuit part having an opened lower end which is closed by said metal layer on said printed circuit board, said microwave circuit part cooperating with said metal layer for defining a horn antenna and a cavity communicating with the inner end of a throat portion of said horn antenna;
   a mixing diode positioned at a feeding point in said throat portion of said horn antenna and interposed between said microwave circuit part and said printed circuit board, said mixing diode having an output terminal extending through said printed circuit board and exposed on the lower side of the printed circuit board;
   a first local oscillator installed on a microwave circuit board disposed in said cavity;
   an intermediate frequency processing circuit portion positioned on the lower side of said printed circuit board around the portion where said output terminal of said mixing diode is exposed, said intermediate frequency processing circuit including a first intermediate frequency filter, a second mixing circuit and a second local oscillator; and
   a shield casing mounted on the lower side of said printed circuit board, said shield casing covering said intermediate frequency processing circuit portion.

2. A microwave detector comprising:
   a one side opened hollow member having a first portion and a second portion;
   a printed circuit board, on which a metal layer is formed on one side, said metal layer on said printed circuit board cooperating with said hollow member for forming a horn antenna at a position corresponding to said first portion and an oscillation cavity for housing a first local oscillator at a position corresponding to said second portion, said horn antenna including a throat portion communicated with said oscillation cavity;
   a first mixing circuit disposed in said throat portion;
   an intermediate frequency processing circuit formed on the other side of said printed circuit board and including a first intermediate frequency filter, a second mixing circuit and a second local oscillator; and
   means for establishing electrical connection between said first mixing circuit and said intermediate frequency processing circuit across said printed circuit board.

3. A microwave detector as set forth in claim 2, wherein said means for establishing electrical connection comprises a terminal of said first mixing circuit extending through said printed circuit board to be exposed to the other side thereof.

4. A microwave detector as set forth in claim 2, which further comprises a shield casing mounted on the other side of said printed circuit board for shielding said intermediate frequency processing circuit.

5. A microwave detector as set forth in claim 3, wherein said first mixing circuit comprises a mixing diode assembly including a rigid leg serving as said terminal and extending through said printed circuit board from said one side to the other side.

6. A microwave detector as set forth in claim 4, wherein said mixing diode assembly comprises a mixing diode and a conductive base for mounting said mixing diode in said throat portion, and said conductive base is formed with said rigid leg.

* * * * *